June 5, 1951     H. W. FAEBER     2,556,032
ROLLER COATING MACHINE

Filed Oct. 6, 1947     12 Sheets-Sheet 1

*INVENTOR.*
HARRY W. FAEBER
BY
Campbell Brumbaugh & Free
*HIS ATTORNEYS.*

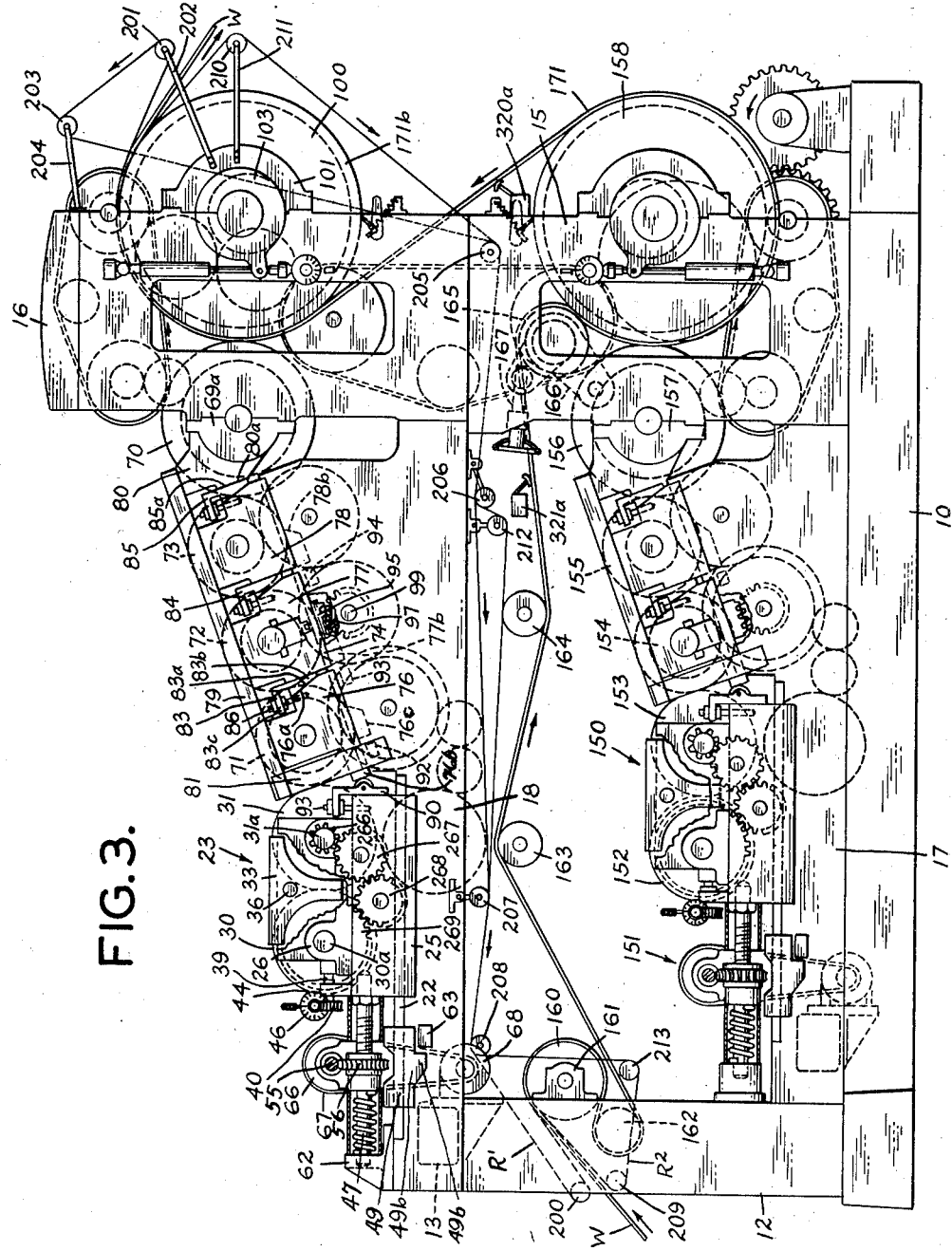

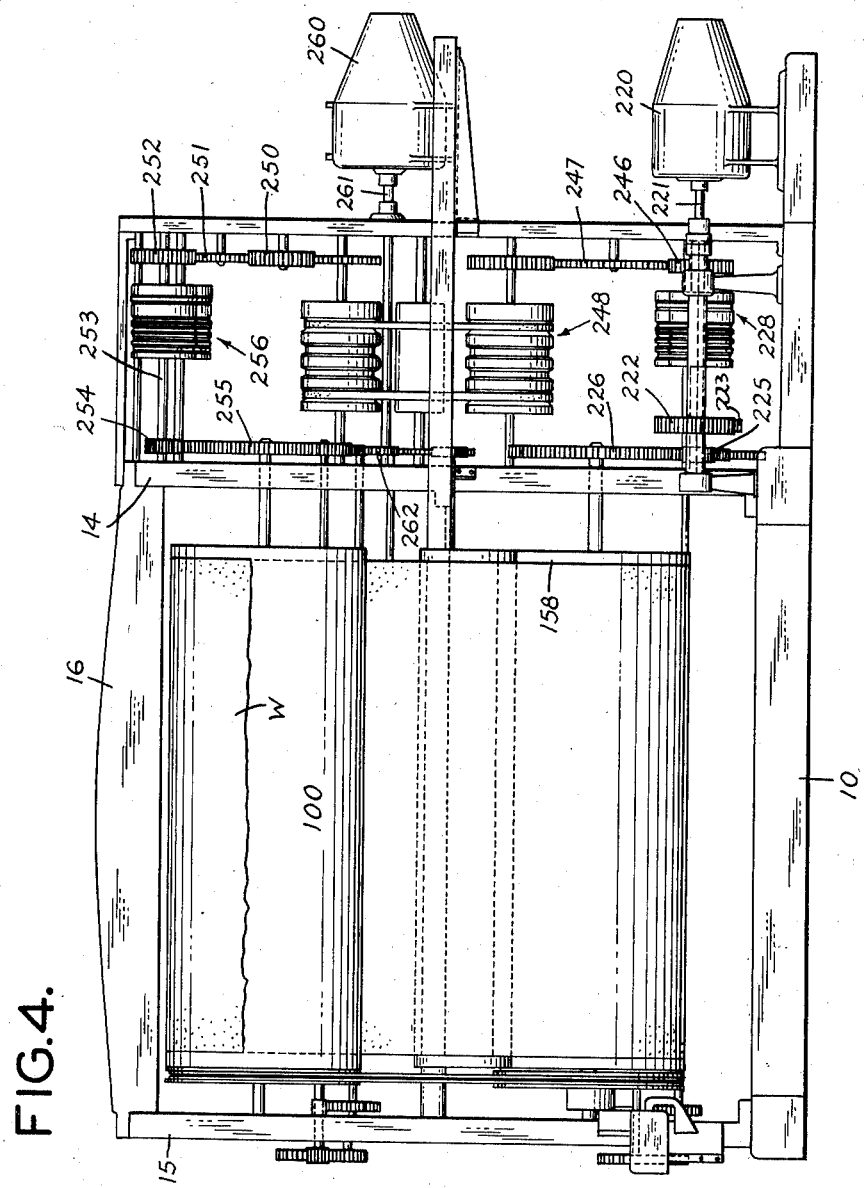

June 5, 1951  H. W. FAEBER  2,556,032
ROLLER COATING MACHINE
Filed Oct. 6, 1947  12 Sheets-Sheet 5

INVENTOR.
HARRY W. FAEBER
BY Campbell, Brumbaugh + Free
HIS ATTORNEYS.

June 5, 1951  H. W. FAEBER  2,556,032
ROLLER COATING MACHINE
Filed Oct. 6, 1947  12 Sheets-Sheet 6
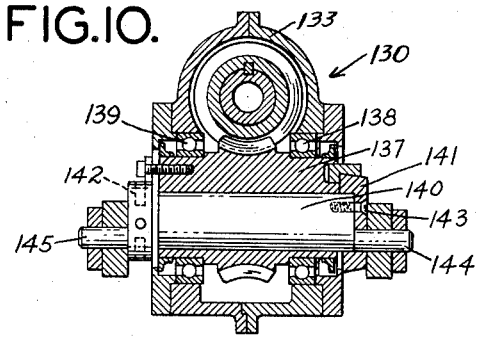
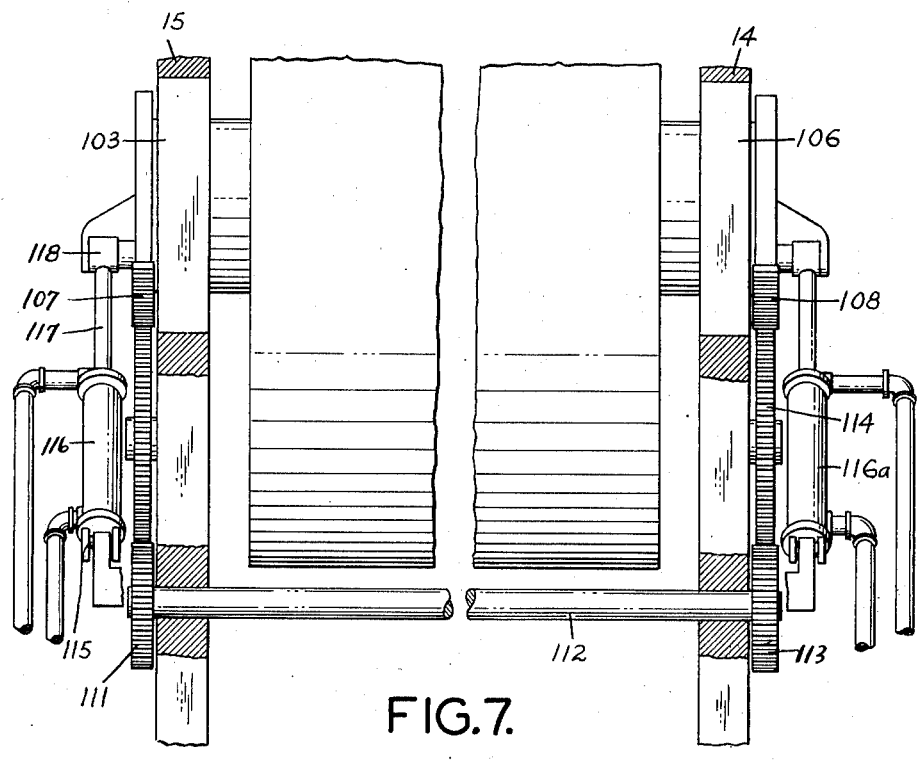
INVENTOR.
HARRY W. FAEBER
BY
Campbell, Brumbaugh & Free
HIS ATTORNEYS.

June 5, 1951     H. W. FAEBER     2,556,032
ROLLER COATING MACHINE
Filed Oct. 6, 1947     12 Sheets-Sheet 9

INVENTOR.
HARRY W. FAEBER
BY
HIS ATTORNEYS.

June 5, 1951 H. W. FAEBER 2,556,032
ROLLER COATING MACHINE
Filed Oct. 6, 1947 12 Sheets-Sheet 12

INVENTOR.
HARRY W. FAEBER
BY
HIS ATTORNEYS.

Patented June 5, 1951

2,556,032

UNITED STATES PATENT OFFICE 2,556,032

ROLLER COATING MACHINE

Harry W. Faeber, Larchmont, N. Y., assignor to Time, Inc., New York, N. Y., a corporation of New York Application October 6, 1947, Serial No. 778,079

19 Claims. (Cl. 91—50)

This invention relates to improvements in coating apparatus, and it relates particularly to machines for applying a coating composition to one or both sides of a continuous web of paper, film or other flexible sheet material.

An object of the present invention is to provide a coating machine that may be adjusted easily to apply a layer of coating composition of a desired thickness to one or both sides of a web.

Another object of the invention is to provide a more easily adjustable mechanism for applying coating compositions to a web.

An additional object of the invention is to provide an improved quick-release mechanism for interrupting the coating process when the web breaks.

Another object of the invention is to provide a simplified mechanism for adjusting the relationship of the gate, distributing, feeding and back up rollers of a coating machine.

A further object of the invention is to provide a novel mounting of the back up rollers or paper drums whereby they may be quickly released from engagement with the coating applicator roller when the web breaks and can be quickly restored to operating position.

Still another object of the invention is to provide an improved rope feed mechanism for threading a web through the coating machine.

An additional object of the invention is to provide a novel arrangement of feeding rollers and web guiding means to facilitate the delivery of the web and the coating composition to the coating zones whereby both sides of the web can be coated.

Other objects of the invention will become apparent from the following description of a typical coating machine embodying the present invention.

Coating machines, according to the present invention, may include cooperating pairs of feeding or applicator rollers and back up rollers between which a web of paper, film or other sheet material is fed in such a way that coating compositions on the coating or applicator rollers may be applied first to one side of the web by one feeding roller and then to the other side of the web by the other coating roller, while the web is supported by the back up rollers.

These coating machines are further characterized by the inclusion of separate fountain or gate rollers and trains of distributing rollers by means of which the coating composition is supplied to the feeding or applicator rollers. The separate trains of rollers are spaced apart one above the other so that the web passes between the trains into engagement with the pairs of feeding and back up rollers.

More particularly, in coating machines of the type embodying the present invention, the various rollers are mounted in a novel manner to facilitate their adjustment and to permit separation of the rollers in the event that the web breaks during a coating operation or in order to permit more ready cleaning and replacement of the rollers. In order to accomplish these results, the applicator rollers which apply the coating composition to the web preferably are maintained in a fixed position in the frame of the coating machine, while the other rollers are adjustable relatively thereto and retained in position by adjusting and/or quick-release mechanisms.

The back up rollers which cooperate with the applicator rollers preferably are mounted in eccentric bearings so arranged that the upper roller must be lifted against the force of gravity to bring it into cooperative relationship with the feeding rollers. Any suitable means, such as, for example, pneumatic or hydraulic cylinders or jacks may be used for lifting the back up rollers into operating position. The jacks are arranged for reverse operation to move the back up rollers out of cooperating position with the feeding rollers in the event that the web breaks or for any other desired reason. The machine preferably is provided with adjustable stops whereby the back up rollers may be set precisely with respect to the applicator or coating rollers so that they can be moved to inoperative position and returned to operating position without requiring additional adjustment.

Similarly, the gate rollers on the coating fountain may be adjusted in order to regulate the amount of coating composition to be delivered to the web and preferably the entire coating fountain may be adjusted bodily to transfer the coating composition to a series of distributing rollers which in turn deliver the coating composition to the coating or applicator rollers.

The distributing rollers are mounted in inclined guides so that they normally tend to move out of engagement with the coating roller under the influence of gravity but can be moved into cooperating relationship with the coating roller by adjusting the position of the coating fountain.

The location of the two trains of rollers for delivering the coating composition to opposite sides of the web facilitates the feeding of the web being coated to the coating rollers. Thus, the web passes between the two trains of rollers and the fountains and out of contact with the rollers.

The web is guided and threaded into the machine by a suitable rope feeding mechanism which is driven in synchronism with the back up rollers. It is necessary only to insert the web between the flights of the rope feed mechanism and it will be threaded properly between the sets of applicator and back up rollers with which it must come in contact in passing through the machine.

The coating machines are further provided with suitable electric control systems whereby the positions of the various rollers and elements may be adjusted and the coating machine started and stopped as required. The electrical systems include web break detecting means for shutting down the operation of the coating machine and also causing disengagement of the coating and back up rollers when the web breaks to avoid fouling the back up rollers with the coating composition.

For a better understanding of the present invention, reference may be had to the accompanying drawings in which:

Figure 1 is a top plan view of a typical coating machine embodying the present invention with parts removed in order to disclose details of construction;

Figure 3 is a view of the opposite side of the machine from Figure 2;

Figure 4 is a view in end elevation looking toward the right-hand end of the machine, as disclosed in Figure 1;

Figure 5 is a view in section taken on line 5—5 of Figure 1, disclosing the relationship of the distributing rollers to the coating roller, the supporting mechanism for the rollers being omitted;

Figure 7 is a view in side elevation of the mechanism disclosed in Figure 6;

Figure 10 is a view in section taken on line 10—10 of Figure 9;

Figure 2:
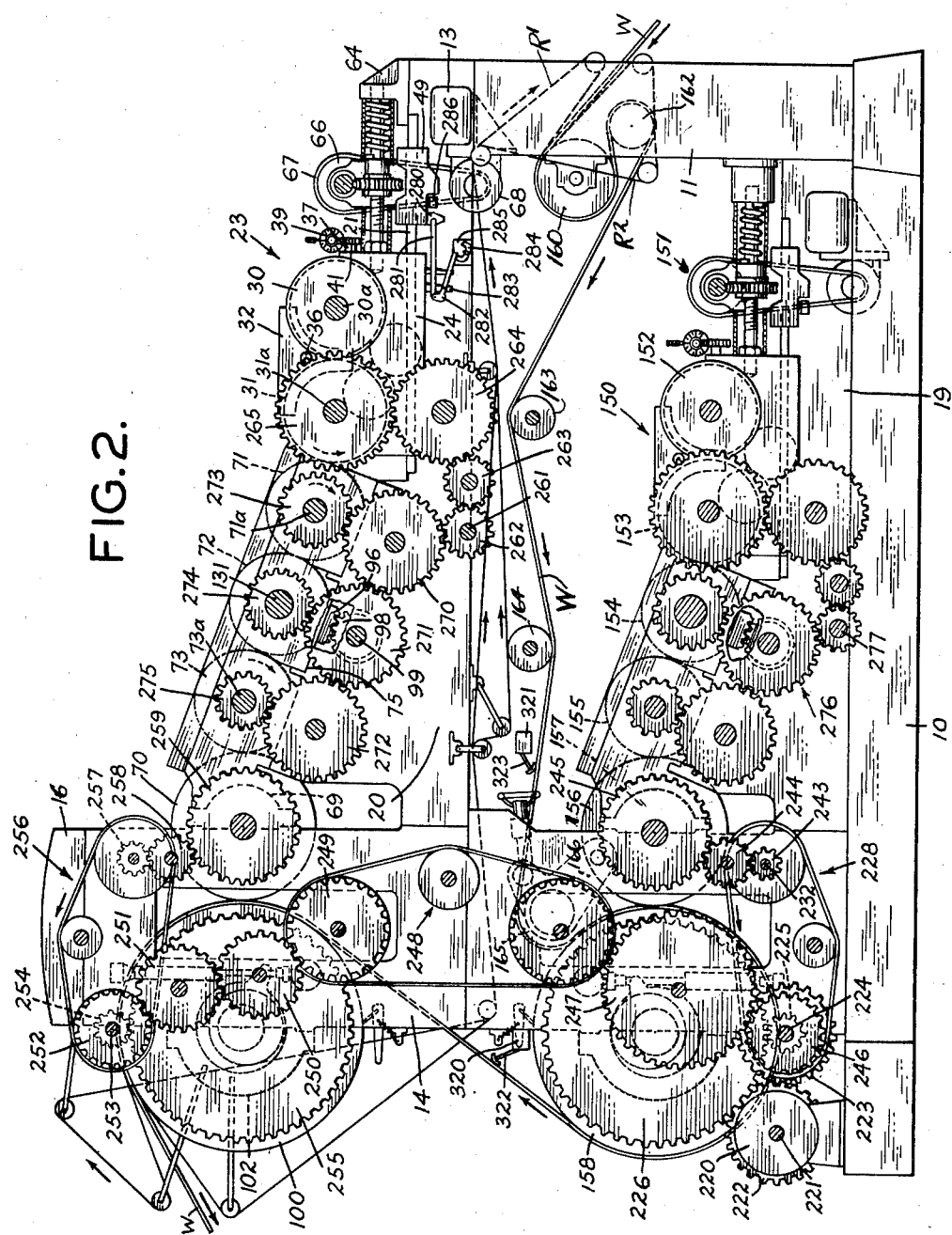
Figure 2 is a view in side elevation of the machine with the motors and part of the frame mechanism omitted to disclose details of construction.

The invention and the various novel features of a typical form of coating machine will be described in connection with a typical embodiment of the invention. While the coating machine hereinafter described is particularly useful for the coating of webs of paper, it will be understood that it can be used for coating film-like materials and sheets of other types of flexible material with equal facility.

The coating machine, as best shown in Figures 1 to 4, may include a suitable base member 10 formed of steel, iron or any other material, having sufficient strength to support the various elements of the machine. Extending upwardly from the base at one end thereof are a pair of standards 11 and 12 which are connected by means of a transverse brace 13 near their upper ends. Near the opposite end of the base are a pair of taller standards 14 and 15 which are connected at their upper ends by a cross member 16 (Figure 4) in order to impart rigidity to them. Other transverse bracing members may be provided at suitable points, as desired.

Extending between the standards 12 and 15, as shown in Figure 3, are two vertically spaced side plate members 17 and 18 which are used for supporting various rollers and mechanisms of the machine. The opposite side of the machine is provided with similar side plate elements 19 and 20 which are substantial mirror images of the side plates 17 and 18, respectively. At the right-hand end of plate 20, as viewed in Figure 2 and the left-hand end of the plate 18, as viewed in Figure 3, are substantially horizontal guide flanges 21 and 22 which serve to support a coating fountain mechanism 23 for movement therealong. The coating fountain 23 is provided with opposite side plates 24 and 25 which constitute the support member for the fountain rolls and are suitably formed to slide upon the guide members 21 and 22. The side plate members 24 and 25 are provided with bearings 26 and 27, 28 and 29 (Figure 1), in which are rotatably mounted the gate rollers 30 and 31 onto which the coating composition is delivered. The ends of the nip between the gate rollers are closed by means of the generally T-shaped plates 32 and 33 which bear against the ends of the roller resiliently under the pressure of suitable springs 34 interposed between the side plates 24 and 25 and the T-plates to prevent leakage past the ends of the rollers. A pipe 36, which carries the coating compound, may be supported in loosely fitting holes in plates 32 and 33. The coating compound emerges from the pipe 36 through several upwardly directed openings, which allow air bubbles to escape.

The gap between the rollers 30 and 31 may be adjusted by means of a micrometer adjusting mechanism including the shafts 37 and 38 (Figure 1) threaded in bosses in the bearings 26 and 28 which are slidably mounted on the side plates 24 and 25. Each of the shafts 37 and 38 is provided with a worm gear 39 and 40 which is rotated by means of the worms 41 and 42 mounted on the shaft 43, which is journalled suitably on the side plates 24 and 25.

The threaded shafts 37 and 38 are supported in bearings 44 (Figure 3) carried by the side plates, so that, upon rotation of the shafts 37 and 38, the roller 30 is moved toward or away from the roller 31. The shaft 43 may be provided with a suitable crank or handwheel 45 for rotating it, and if desired, a further reduction gearing with a micrometer dial 46 (Figure 3) may be provided for making extremely close adjustments of the spacing of the rollers. The clutch 43a on the shaft 43, as shown in Figure 1, permits the two worms 41 and 42 to be disconnected, allowing independent adjustments for aligning roller 30 with roller 31. Once alignment is established, the clutch 43a is re-engaged.

Figure 8:
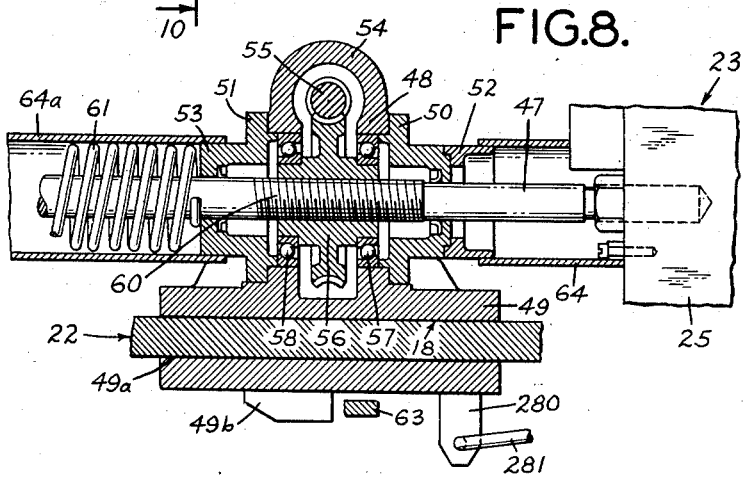
Figure 8 is a view in longitudinal cross section and partly broken away of the adjusting mechanism for the coating fountain.

The entire coating fountain 23 may be adjusted along the rails 21 and 22 by means of a pair of worm gear drives, one of which is disclosed in detail in Figure 8 of the drawings and disclosed schematically in Figures 1 to 3 of the drawings.

Referring now to Figure 8, each of the adjusting mechanisms at opposite ends of the fountain 23 may include a threaded shaft 47, which is fixed to the left-hand end of the coating fountain 23, as viewed in Figure 3. The threaded shaft 47 is threaded into and fixed to the end plate 25, for example, and extends through a gear housing 48 which is slidably mounted on the rail 22 on the side plate member 18. The housing 48 has a base or lower housing 49 provided with grooves 49a for receiving the rail 22 and retaining the housing 48 on the rail 22. The housing 48 also has generally disc-like side portions 50 and 51 which are provided with tubular extensions 52 and 53, respectively. The upper portion 54 of the housing 48 is semi-cylindrical in cross section for receiving a worm 55 that meshes with a worm gear 56 mounted between the side plate members 51 and 52 and supported for rotation in suitable anti-friction bearings 57 and 58. The actual shape of the housing 48 is unimportant and may be varied as desired. The hub 59 of the worm gear 56 is provided with internal threads engaging the threads 60 on the threaded shaft 47 so that rotation of the worm gear 56 moves the shaft 47 axially to the right or left.

The housing 48 is normally urged toward the right, as viewed in Figures 1, 3 and 8, by means of a coil spring 61 which encircles the shaft 47 and has one end abutting against the tubular portion 53 of the housing. The opposite end of the spring 61 bears against the angle member 62 fixed to the standard 12 urging the housing 48 and the lower housing 49 to the right (Figures 3 and 8) to bring the stop lug 49b on the lower housing 49 into engagement with the stop lug 63 fixed to the side plate 18.

In order to shield the operating mechanism from dirt, a tubular sleeve 64 may be mounted on the side plate 25 of the fountain 23 and telescopically receives the tubular portion 52 of the gear casing or housing. Similarly, the spring 61 may be housed within another tubular sleeve 64a which is supported at its left-hand end on the angle member 62 and receives telescopically the sleeve 53 on the housing 48.

The adjusting mechanisms at opposite ends of the fountain 23 may be connected by means of a cross shaft 65 (Figure 1) on which the worm 55 and the corresponding worm at the opposite end of the shaft are mounted. The shaft 65 is provided with a pulley 66 for receiving a belt 67 that connects the pulley 66 to an electric motor 68 mounted on the cross member 13. The clutch 65a on the shaft 65, as shown in Figure 1, permits the two sections of the cross shaft 65 to be disconnected for adjusting the alignment between the two ends of the fountain assembly 23. Once the proper alignment is established, the clutch is re-engaged.

The above-described mechanisms permit the adjustment of the coating fountain 23 to the right or to the left and also permit precision adjustment of the gate rollers 30 and 31 with respect to each other.

The gate roller 31 is utilized to deliver the coating composition to a coating or applicator roller 70 which is rotatably mounted in and supported by means of split journals 69 and 69a on the standards 14 and 15 near their upper ends. The applicator roller 70 is not adjustable, but all of the other rollers of the machines are adjustable with respect to the applicator or coating roller, with the latter serving as a reference point for such adjustment.

Figure 9:
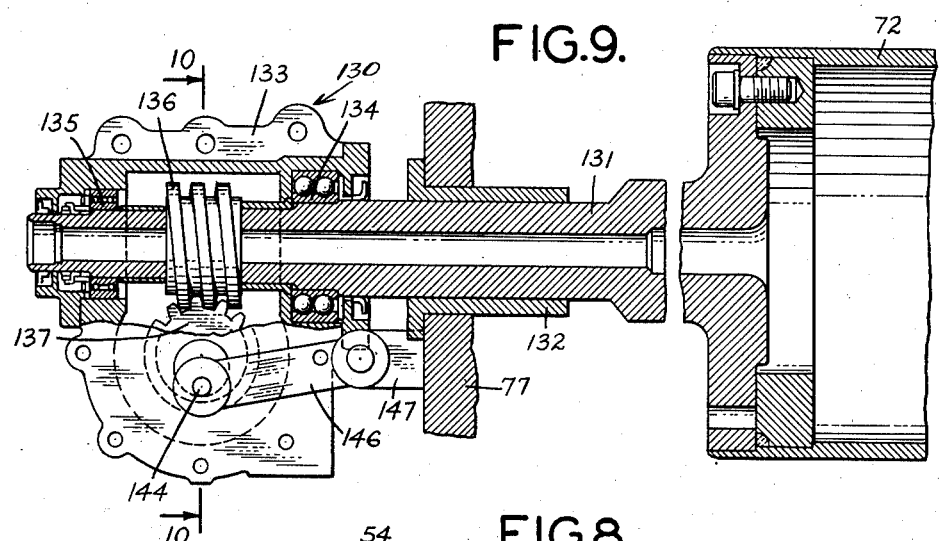
Figure 9 is a view in side elevation and partly in section of a vibrating mechanism for one of the distributing rollers.

The coating composition is transported to the roller 70 from the gate roller 31 by means of a series of three distributor rollers 71, 72 and 73. As shown in Figure 5, the three distributor rollers may have different surfacing materials thereon, for example, the roller 71 may be provided with a rubber surface, the roller 72 may be a metal roller, and the rollers 70 and 73 may be provided with rubber surfaces, respectively, in order to facilitate the distribution and transfer of the coating composition to the web. The distributor roller 72 preferably is hollow, as shown in Figure 9, so that coolant may be introduced into this roller to keep the coating composition on the roller below the dew point and thereby prevent an increase in the viscosity of the coating composition while it is being worked on the rollers, as described more particularly in my copending application Serial No. 710,395, filed November 16, 1946.

As indicated above, the longitudinal adjustment of the fountain 23 may be used for bringing the distributor rollers 71, 72 and 73 into proper cooperating relationship with the roller 70. Referring now to Figures 2 and 3, the side plates 18 and 20 are provided with inclined guide surfaces 74 and 75 between the applicator roller 70 and the fountain 23. Each end of the rollers 71, 72 and 73 is supported in a journal block 76, 77 and 78, respectively. The journal blocks at opposite ends of the rollers 71, 72 and 73 are alike and therefore only one set of the journal blocks will be described. Each of the blocks is provided with bottom grooves slidably engaging the rail 74. The upper ends of the journal blocks 76, 77 and 78 are received in a channel member 79 which is in spaced relationship to the guide surfaces 74 and is retained in such spaced relationship by means of the bracket 80 projecting from the standard 15 and the bracket 81 projecting upwardly from the side plate 18. The journal blocks 76, 77 and 78, therefore, are guided for sliding movement under the action of gravity downwardly toward the fountain 23 so that the roller 73 also tends to move out of engagement with the feeding or applicator roller 70. Proper spacing between and alignment of the rollers 71, 72 and 73 is obtained by means of the adjusting wedges 83, 84 and 85 at each end of the rollers 71, 72 and 73. The wedge 83, which is like the other wedges 84 and 85, includes an inclined surface 83a which bears against a complementary inclined surface 76a on the journal block 76 and has an opposite edge 83b which extends perpendicular to the guide surface 74. The surface 83b engages the adjacent edge of the journal block 77. Thus, up or down movement of the wedge 83 varies the spacing between the journal blocks 76 and 77. Such movement may be accomplished by means of a threaded stud 86 which extends through an arm 83c projecting laterally from the wedge member 83 and which is provided with nuts above and below the arm 83c for clamping the wedge member 83 in position. The arm 83c is provided with a slot, not shown, permitting the necessary lateral movement of the wedge 83 with respect to the stud 86.

The wedge 85 is like the wedge 83, but its vertical surface 85a bears against a fixed stop surface 80a on the bracket 80 to regulate the spacing between the rollers 73 and 70.

Proper spacing between the rollers 71 and the gate roller 31 may be obtained by means of a similar spacer construction, in this case a slide member 90 carried on each of the end plates 24 and 25 having a roller 91 bearing against a projecting lug 76b on the journal member 76. The lug 76b has an end surface normal to the guide member 74 and thus inclined with respect to the slide plate 90. The slide plate 90 and the roller thereon may be adjusted up and down by means of a nut and stud construction 93 whereby variation in the spacing of the rollers 31 and 71 is obtained.

Inasmuch as the distributor rollers 71, 72 and 73 are retained against movement to the left (Figure 1) only by the fountain 23, it will be clear that adjustment of the fountain 23 to the right or the left will also adjust the roller 73 toward and away from the feeding roller 70 so that easy adjustment and ready separation of all of the rollers for replacement, cleaning or other purposes can be accomplished without readjusting the parts when it is desired to put the machine into operation.

The journal plates 76, 77 and 78 are prevented from sliding off the inclined guideways 74 and 75 by means of downwardly projecting lugs 76c, 77b and 78b which engage corresponding stop lugs 92, 93 and 94, respectively, carried by the side plates 18 and 20. The lugs are so spaced that when the lugs 92, 93 and 94 engage the lugs 76c, 77b and 78b, respectively, the distributor rollers 71, 72 and 73 are separated from each other.

The rollers 71 and 73 are journalled in self-aligning anti-friction bearings, so that they will tolerate misalignment of their two ends in case of unequal adjustment or accidental slewing or tilting. However, the roller 72 is a "vibrating" roller, which not only rotates, but also reciprocates, and is journalled in plain straight-bore bearings. To protect these bearings and the shaft ends, it is necessary to prevent excessive slewing or tilting of this roller. This is accomplished by means of rack elements 95 and 96 (Figures 2 and 3) carried by the journal block 77 at opposite ends of the distributor roller 72. These racks 95 and 96 mesh with gears 97 and 98, respectively, which are fixed to a shaft 99 journalled in the side plates 18 and 20. Therefore, when the journal blocks at opposite ends of the roller 72 slide downwardly, they must slide together through equal distances inasmuch as they are geared together by means of the gears 97 and 98. Sufficient backlash is provided between racks 95 and 96 and gears 97 and 98, respectively, to allow independent adjustment of the wedges at either end of the roller within a few thousandths of an inch of each other. This permits parallel adjustment of the rollers, but at the same time prevents harmful misalignment.

The above-described inclined mounting of the distributing rollers has a number of advantages in addition to those described above. The inclined mount decreases the overall length of the machine, which is of particular importance when the machine is to be installed as a part of a paper making machine. In addition, if the coating composition should run or drip from the distributor rollers or any oil or grease should leak from their bearings or guides, it will run away from the applicator roller and not contaminate or mar the web.

Figure 6:
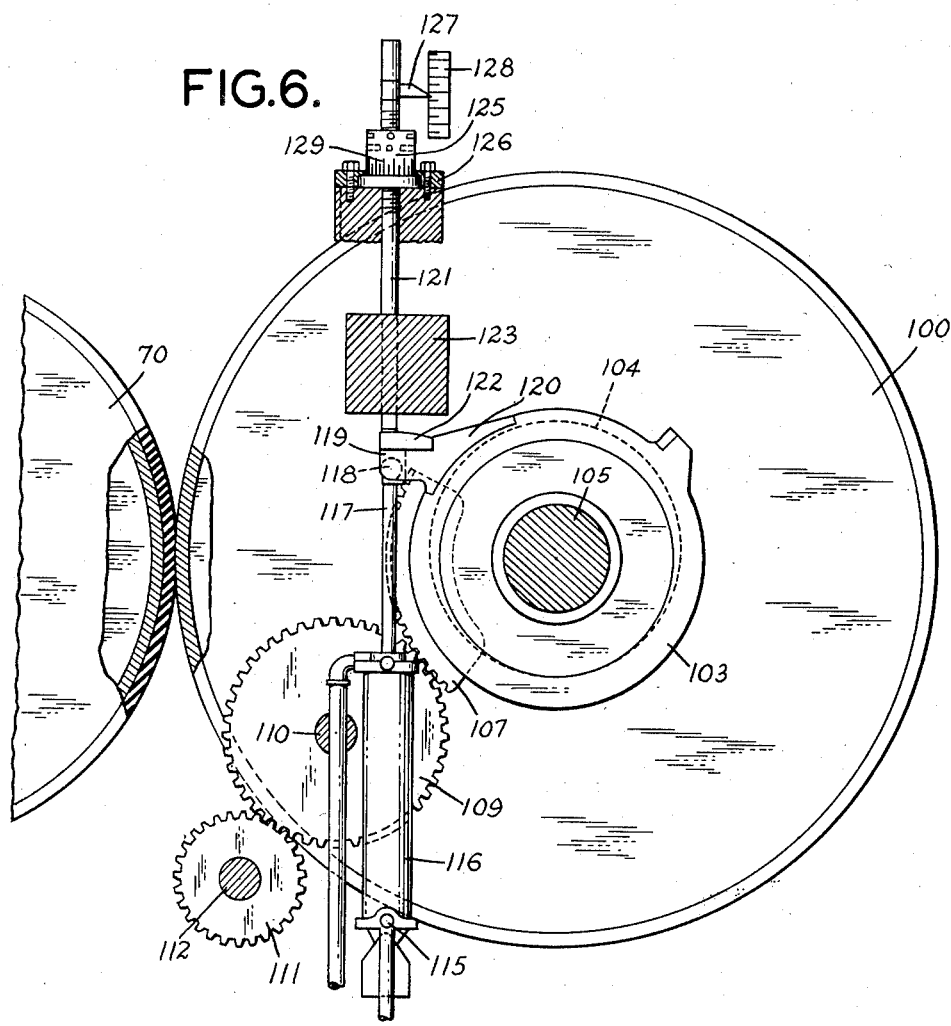
Figure 6 is a view in end elevation of the control mechanism for one of the back up rollers, the frame of the machine being omitted and parts being shown in section to better disclose the invention.

The applicator or coating roller 70 cooperates with a paper drum or back up roller 100 which is mounted in suitable split bearings 101 and 102 mounted on the uprights 15 and 14, respectively. The back up roller 100 is adapted to be moved out of engagement with the applicator roller 70 and to be moved into engagement with the applicator roller by the mechanism now to be described and best shown in Figures 3, 6 and 7 of the drawings. As shown in Figures 3 and 6, the bearings 101 receive an annular bearing collar 103 for rotation therein. The bearing collar 103 is provided with an eccentric disc portion 104 which is rotatable in the bearing or journal 101, this eccentric portion being also eccentric to the center of the shaft 105 which supports the back up roller 100. Thus, by rotating the sleeve 103, the back up roller 100 may be moved toward or away from the applicator roller 70. The opposite end of the roller 100 is mounted in a similar eccentric sleeve construction 106. In order to cause the collar 100 to move without slewing or tilting, the eccentric collars 103 and 106 are provided with arcuate racks or segmental gear portions 107 and 108. The segmental gear 107 meshes with an idler gear 109 mounted on a stub shaft 110 projecting from the side plate 15. The idler gear 109 meshes with gear 111 which is fixed to a shaft 112 extending transversely between the standards 14 and 15. The opposite end of the shaft 112 is provided with a gear 113, like the gear 111, which meshes with idler gear 114. The segmental gear 108 meshes with the idler gear 114 so that the eccentric collars 103 and 106 must rotate simultaneously through the same angle. However, sufficient backlash is provided between the teeth of the several gears and racks to permit some independent adjustment of the two ends of the roller 100 to bring it into parallel relationship with the applicator roller 70.

The collars 103 and 106 are rotated to bring the rollers 70 and 100 into engagement by means of the following mechanism. Mounted on the standard 15 for movement about a pivot 115 is a pneumatic or hydraulic jack cylinder 116 having a piston and a piston rod 117 provided with a cylindrical end portion 118. The cylindrical end portion 118 engages in a notch 119 in and is pivotally connected to a lug 120 which projects outwardly from the collar 103. When the piston rod 117 is retracted, the collar 103 rotates in a counter clockwise direction, thereby moving the roller 100 out of engagement with the roller 70. When the piston rod 117 is projected under pressure, it rotates the collar 103 in a clockwise direction, thereby moving the roller 100 inwardly into engagement with the applicator roller 70. The position of the back up roller 100 may be adjusted by the mechanism shown in Figure 6. This mechanism includes a rod member 121 having a lower end adapted to engage an abutment member 122 formed of steel or other material which is fixed to the upper edge of the arm 120. The rod 121 is guided slidably but non-rotatably in a bearing 123 carried by the side frame member 15 and extends through another guide member 124 also mounted on the side frame member 15. An indicating and adjusting nut 125 is threaded on the upper end of the rod 121 and is retained in engagement with the guide member 124 by means of a flanged ring 126 bolted or otherwise secured to the guide member 124. The upper end of the rod 121 is provided with a pointer 127 which cooperates with a scale 128 fixed to the standard 15 to indicate the adjusted position of the rod 121. The nut 125 may also be provided with scale markings 129 permitting fine or close adjustment of the rod 121.

When the rod 121 has been adjusted for proper contact between the rollers 70 and 100, the roller 100 may be retracted and then returned to its adjusted position, as for example, after the paper web has broken and has been rethreaded without necessitating further adjustment of the roller 100. It will be understood that the opposite end of the back up roller may be moved by means of a similar jack 116a and adjusted by an adjusting mechanism like that shown in Figure 6.

In order to facilitate the distribution of the coating composition over the applicator roller 70, one of the distributing rollers, preferably the roller 72, is vibrated longitudinally. The vibrating mechanism 130 is best shown in Figures 1, 9 and 10. As shown in Figure 1, the roller 72 is carried in bushings in its journal block 77 at opposite ends for reciprocating movement and is adapted to be moved endwise by the reciprocator 130, which is also carried by one of the journal blocks 77. Referring now to Figures 9 and 10, the roller 72 has a stub shaft 131 of substantially greater length than the length of the bushing 132 in the journal block 77. The shaft 131 extends into a split housing 133 where it is supported in suitable anti-friction bearings 134 and 135 which prevent relative endwise movement between the housing 133 and the shaft 131. The shaft 131 is provided with a worm 136 which meshes with a worm gear 137 that has its opposite ends mounted in the bearings 138 and 139, as shown in Figure 10. Extending through the shaft 137 of the worm gear and eccentric to its axis is a shaft 140 which is provided at opposite ends with disc-like elements 141 and 142. Disc 141 is anchored to the shaft 140 by means of suitable machine screws 143. The disc 141 is provided with an eccentrically located crank pin 144 and the disk 142 also has an eccentrically positioned crank pin 145 thereon. The assembly consisting of the shaft 140, discs 141 and 142 and the crank pins 144 and 145 may be adjusted angularly with relation to their supporting shaft 140 in order to vary the eccentricity of the crank pins 144 and 145 with respect to the axis of the shaft 137. The crank pins, for example, pin 144, is connected by means of a link 146 to a lug 147 on the journal block 77. The journal block, therefore, forms the anchor point for reciprocation of the distributor roller 72. As the roller 72 rotates, it, as well as the housing 133, and the mechanism enclosed therein is reciprocated relatively to the journal block 77. The extent of reciprocation can be varied by adjusting the discs 141 and 142 to vary the eccentricity of the crank pins 144 and 145.

The mechanism described above is used for applying a coating composition to one side of the web of paper, and it is substantially duplicated by the mechanism used for applying the coating composition to the other side of the web. Thus, as shown in Figures 2 and 3, the other coating train includes a coating fountain 150 which is adjustable on the side plates 17 and 19 by the adjusting mechanisms 151, and includes the gate rollers 152 and 153. The gate roller 153 delivers the coating composition to the first of two distributing rollers 154 and 155 which correspond structurally and in their mounting to the rollers 72 and 73 described above. The roller 155 transfers the coating composition to the applicator or coating roller 156 which is mounted in suitable bearings 157 near the lower portion of standards 14 and 15 and below the applicator roller 70. The applicator roller 157 cooperates with a back up roller or paper drum 158 which is supported on the standards 14 and 15 in exactly the same way as the roller 100.

The paper web W passes between the applicator roller 156 and the back up roller 158 and then between the applicator roller 70 and the back up roller 100. The web is guided into this position by means of an idler roller 160 rotatably mounted in bearings 161 fixed to the standards 11 and 12, then over and around an idler roller 162 also journalled in the standards 11 and 12, then over the idler rollers 163 and 164 journalled in the side frames of the machine. From beneath the roller 164, the web passes over a supporting roller 165 and then into the nip between the applicator roller 156 and the back up roller 158, downwardly around the back up roller 158 and upwardly and forwardly between the rollers 70 and 100 and out of the machine over the roller 100. The above-described movement of the web W presents its opposite sides to the applicator rollers 156 and 70.

The pinch roller 165 is journalled in levers 166 at its opposite ends, which are pivotally mounted in the side frame members 14 and 15. An adjusting screw and handwheel member 167 is provided which engages the outer end of the levers 166 to move the roller 165 toward and away from the back up roller 158.

Figure 12:
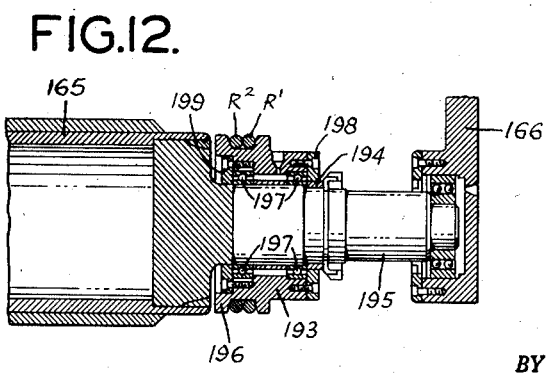
Figure 12 is a view in section of one of the supporting rollers for the web, illustrating the pulley mounting thereon for the rope feeding mechanism.
Figure 11:
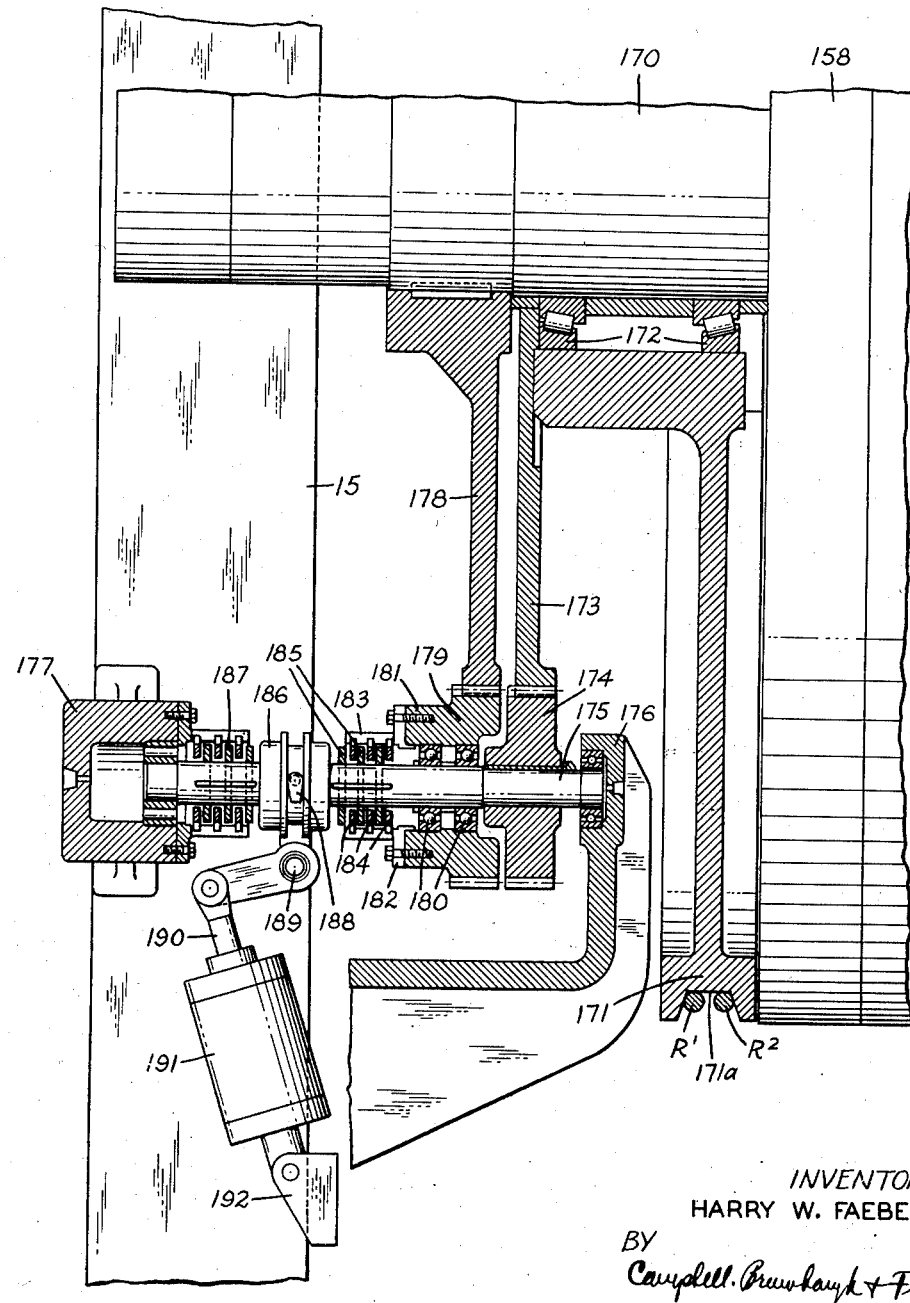
Figure 11 is a view partly in section and partly broken away, disclosing the clutching mechanism for coupling the rope feeding and threading mechanism to a back up roller.

The various rollers 160, 162, 163, 164, 165, 158 and 100, together with other rollers to be described, also support a rope feed construction for threading the web through the coating machine. The rope feed mechanism may include two ropes R1 and R2 which are adapted to nip one edge of the paper web between them and cause the paper web to follow the paths of the ropes through the machine. The guide and drive means for the rope feed mechanism are best shown in Figures 11 and 12 of the drawings. Referring to Figure 11, the drum or back up roller 158 is provided with a supporting shaft 170 which also forms a support for a large pulley 171 of about the same external diameter as the diameter of the back up roller 158. The pulley 171 is provided with a groove 171a for receiving the two ropes R1 and R2. The pulley 171 is rotatably mounted on the shaft 170 by means of suitable bearings 172 so that the pulley can rotate relatively to the roller 158. Fixed to the pulley 171 is a large gear member 173 which meshes with a smaller gear 174 keyed to a clutch shaft 175 that is mounted in suitable journal members 176 and 177 on the standard 15.

The shaft 170 also is provided with a gear 178 which is rotatable therewith and meshes with a gear 179 that is supported for rotation relatively to the shaft 175 by means of anti-friction bearings 180. The hub 181 of the gear 179 is provided with an end plate 182 having a cage 183 thereon for receiving slidably a plurality of clutch discs 184. These clutch discs 184 are interleaved with other clutch discs 185 splined to the shaft 175 and slidable axially thereon. The interleaved clutch discs 184 and 185 serve to clutch the gear 179 to the shaft 175. This is accomplished by means of the shiftable hub member 186 which is splined to the shaft 175. When the member 186 is moved toward the right, it compresses the clutch discs 184 and 185 together and thereby connects the shaft 175 to the gear 179 and as a result causes the pulley 171 to rotate with the back up roller 158.

The pulley 171 can be locked or braked against rotation by means of a similar clutch or brake mechanism 187 having clutch plates carried respectively by shaft 175 and the journal member 177. The clutching member 186 may be actuated by a shifter fork 188 in the form of a bell crank which is pivoted on a pivot pin 189 carried by the frame member 15. The end of the bell crank 188, remote from the clutch member 186, is connected to the piston 190 of the hydraulic or pneumatic jack 191, which is pivotally supported on a bracket 192 carried by the standard 15. Thus, when the connecting rod 190 is extended, the pulley 171 is coupled to the back up roller 158 and rotates therewith. When the connecting rod 190 is retracted, the pulley 171 is brought to a standstill by the brake 187.

Each of the rollers 160, 162, 163, 164 and 165 may also be provided with pulleys for supporting the ropes R1 and R2. Referring to Figure 12, a typical pulley construction which is shown as applied, for example, to the pinch roller 165, includes a sleeve 193 which is journalled in a portion 194 of the supporting shaft 195 of the roller 165. The sleeve 193 is provided with a pulley portion 196 and the whole sleeve is mounted on suitable anti-friction bearings 197, which are locked in position by means of retaining rings 198 and 199 at opposite ends of the sleeve 193. The ropes R1 and R2 must, of course, be separated at the feed end to permit the insertion of the web therebetween and they must separate at the outlet end of the coating machine to permit the web to be removed from the coating machine. As best shown in Figure 3, starting at the feed end of the machine, the rope R1 passes around a pulley 200, then around the pulleys associated with the rollers 160, 162, 163, 164, 165, the pulley 171, around the corresponding pulley 171b associated with the back up roller 100, then around a pulley 201 mounted on an arm 202 extending from the upright 15, over the pulley 203 mounted on the arm 204 extending outwardly from the standard 15, downwardly and around an idler pulley 205 mounted on the standard 15, over the tensioning pulley 206 and under the tensioning pulley 207 carried by the side plate 18, over the idler pulley 208 and back to the pulley 200.

The lower rope flight R2 passes around the pulley 209, around the pulleys associated with the rollers 160, 162, 163, 164, 165, the pulley 171, the corresponding pulley 171b associated with the drum 100, and downwardly around the idler pulley 210 mounted on the arm 211, extending outwardly from the standard 15. The rope R2 then passes beneath the pulley 205, over the pulley 206, beneath a tensioning pulley 212 carried by the side plate 18 below the pulley 207, over the pulley 208, downwardly beneath the pulley 213 and back to the pulley 209.

In a preferred alternative rope lead flights R1 and R2 both may be part of a single endless loop of rope. In such case, the inevitable cross-over from the inner flight to the outer flight can be effected between pulleys 206 and 207 with the aid of tension pulley 212.

The various sets of rollers making up the coating machine as described above are driven by means of suitable transmissions which permit a very flexible adjustment of the relative speeds of the various groups of rollers. While the transmissions may take many different forms, the best results are obtained by using a combination of variable speed V-belt transmissions with gear trains which positively connect various sets of the rollers to relate their speeds.

Figure 13:
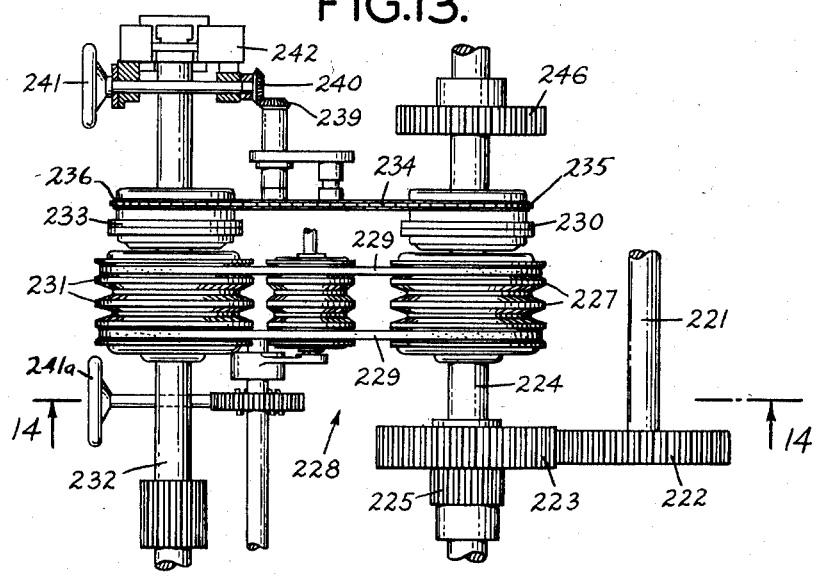
Figure 13 is a plan view of one of the variable speed V-belt transmissions for the coating machine.
Figure 14:
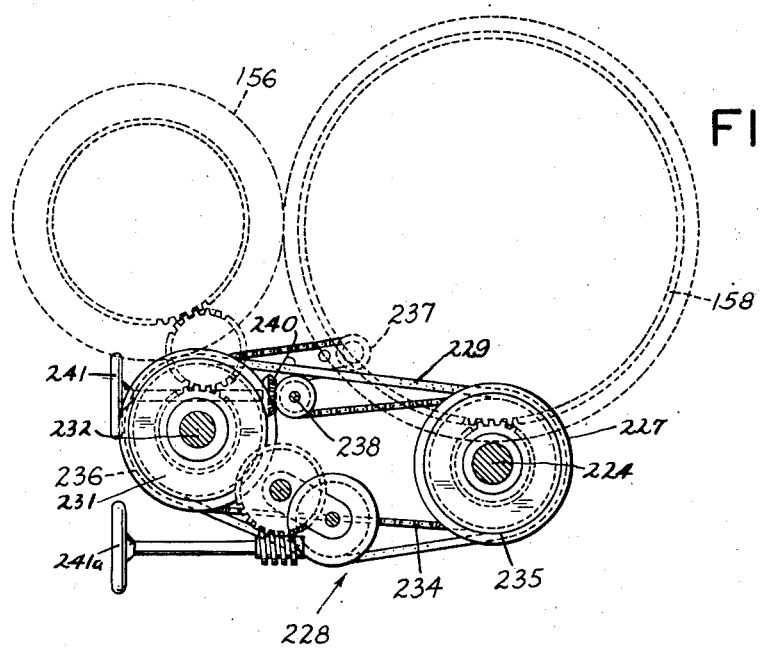
Figure 14 is a view in section taken on line 14—14 of Figure 13.

The applicator rollers 70 and 156, and the back up rollers 100 and 102 are driven independently of the fountains 23 and 150, and the sets of distributor rollers. The drive mechanism for the applicator rollers 70 and 156 and the back up rollers 100 and 158 includes an electric motor 220 (Figures 1 and 4) which is mounted on the base 10 and drives a shaft 221 having a gear 222 thereon, which meshes with and drives a gear 223 carried on a shaft 224. The above gear constructions are best shown in Figures 1, 2, 4, 13 and 14. The shaft 224 is journalled in suitable bearings carried by the base plate 10 and is used to drive the back up roller 158 by means of the gear 225 carried by the shaft 224 and the gear 226 fixed to the back up roller 158. The shaft also carries the cone elements 227 of a variable speed V-belt transmission 228. The transmission 228 is of conventional type and is best shown in Figures 13 and 14. The cone elements 227 of the clutch are keyed to the shaft 224 but are slidable relatively thereto in order to vary the spacing between the cone elements 227 which receive the V-belts 229. Adjustment of the cone elements 227 is accomplished by means of an abutment member 230 which is mounted on the shaft 224 for rotation relatively to the shaft but can be expanded axially to bring the cone elements 227 closely together or to relieve them so that they may separate to permit the V-belts to slide inwardly between the pulleys.

The V-belts 229 also pass around the variable cone pulleys 231 carried by the shaft 232 which may be similarly adjusted in the opposite direction from the cone pulleys 227 by means of a suitable expanding and contracting member 233 rotatably mounted on the shaft 232. Thus, as the cone pulleys 227 become narrower, the cone pulleys 231 become wider, and in this way, the speed relationships of the shafts 224 and 232 can be varied. The members 230 and 233 may be expanded or contracted by means of a chain 234 which passes around them and engages with the sprockets 235 and 236 carried thereby. The chain 234 also passes around an idler sprocket 237 and a sprocket 238 which may be rotated by means of the bevelled gears 239 and 240 connected respectively to the sprocket 238 and to a handwheel 241 carried in a suitable mount 242 on the base plate 10 of the machine. Proper tension on the V-belts 229 may be obtained by means of an idler pulley adjusted in any suitable way, for example, by means of the handwheel 241a.

The shaft 232 is provided with a gear 243 which meshes with an idler gear 244 (Figure 2), which in turn meshes with a gear 245 fixed to the applicator roller 256. Thus, the motor 220 drives the back up roller 158 directly through the transmission gearing and drives the applicator roller 156 through gearing and the variable speed V-belt transmission 228 so that the relative speeds of these rollers may be adjusted.

The shaft 224 also carries another gear 246 which meshes with a larger idler gear 247 for transmitting of the rotation of the shaft 224 to one end of a variable speed V-belt transmission 248 like the transmission 228 described above. The output gear 249 of the transmission 248 drives two meshing idler gears 250 and 251, the latter driving a gear 252 carried on a shaft 253 mounted in the standard 14. The shaft 253 is also provided with a drive gear 254 which meshes with a gear 255 fixed to the back up roller 100. The ratios of the gearing connecting the back up rollers 100 and 158 is such that these rollers can be adjusted to exactly the same speed, or the relative speed of the two back up rollers may be adjusted for the proper "draw" of the web which may shrink or extend slightly after it receives the first film of coating.

The shaft 253 is also at the end of a variable speed V-belt transmission 256 like the transmission 228 described above, which also has an output gear 257 for driving the applicator roller 70 by means of the gears 258 and 259, the latter being fixed to the roller 70. The above-described transmission permits wide variation in the speeds of the various rollers, if desired, or they can be adjusted so that the peripheral velocities of all of the rollers are exactly the same.

The fountains 23 and 150 and their associated distributor rollers are driven by means of separate electric motors. The fountain 23 is driven by means of a motor 260 (Figures 1 and 4) having a shaft 261 journalled in the side plates 18 and 20 and provided with a gear 262. The gear 262 meshes with an idler gear 263 (Figure 2) which drives a larger gear 264 meshing with a gear 265 carried on the shaft 31a of the roller 31. The shaft 31a carries at its opposite end a gear 266 (Figure 3) which drives the roller 30 by means of the idler gears 267, 268 and the gear 269 fixed to the shaft 30a of the roller 30. This transmission causes the roller 31 to be driven at a higher peripheral velocity than the roller 30.

The motor driven gear 262 is also used to drive the distributor rollers 71, 72 and 73. Thus, the gear 262 meshes with the train of gears 270, 271 and 272 all mounted for rotation on the side plate 20 and meshing respectively with the gears 273, 274 and 275 fixed to the shafts 71a, 131 and 73a of the rollers 71, 72 and 73. All of the rollers 71, 72 and 73 may be driven at the same speed, or, by varying the sizes of the gears in the above-described gear train, they may be driven at different speeds. In the preferred design, as shown in Figure 2, the sizes of the gears are so selected as to drive the roller 73 at a higher speed than 72, which in turn is running at a speed higher than the speed of the roller 71. The gear 274, furthermore, differs from the other gears 273 and 275 in that it is thicker than these gears in order to permit a reciprocation of the roller 72 without disengaging its driving gear 271.

The fountain 150 and the associated applicator rollers 154 and 155 are driven by a similar gear train 276 which is driven by means of the shaft 277 connected with an electric motor (not shown).

All of the motors may be of variable speed type so that their speeds may be correlated in order to obtain the proper roller speeds under operating conditions. Each of the motors may be provided with suitable controllers in order to start and stop them and also to adjust their speed.

As indicated previously, the fountains 23 and 150 are arranged to be moved toward and away from the applicator rollers 70 and 156. In order to control the movement of the fountains and thus prevent damage to the machine by overrunning the projected and retracted limit positions, each of the fountains 23 and 150 and its associated driving mechanism, is provided with a limit switch which is best shown in Figures 2 and 8 of the drawings. The lower housing 49 of the projecting and retracting mechanism is provided with a downwardly extending lug 280 and a link 281 pivotally connected to it. The link 281 is connected to a bell crank lever 282 (Figure 2) carried by the side frame member 20. The bell crank 282 is adapted to engage a C-shaped arm 284 of a toggle type switch 285. The C-shaped arm 284 is so positioned that when the fountain 223 moves toward the housing 49, the lug 283, which is attached to the fountain side plate 24, will strike the right-hand branch of the C-shaped arm 284, as shown in Figure 2, and rotate it clockwise, which will throw the limit switch.

When the fountain 23 is moved to the left, it will eventually fetch up all the adjustable stops such as 90, 83, 84 and 85 in contact with their respective strike member (see Figure 3). At this instant, the lug 49b will separate from the stop 63 and the preloaded spring 61, as best shown in Figure 8, will begin to collapse due to the movement of the worm gear housing in a direction away from the fountain. This movement by means of the lug 280 and the link 281, causes the bell crank 282 to rotate clockwise, striking the left side branch of the C-shaped arm 284 and rotating in counter-clockwise. Thus, as soon as the pressure of the spring 61 is brought to bear against the several stops such as 90, 83, 84 and 85, the limit switch 285 is thrown.

Figure 15:
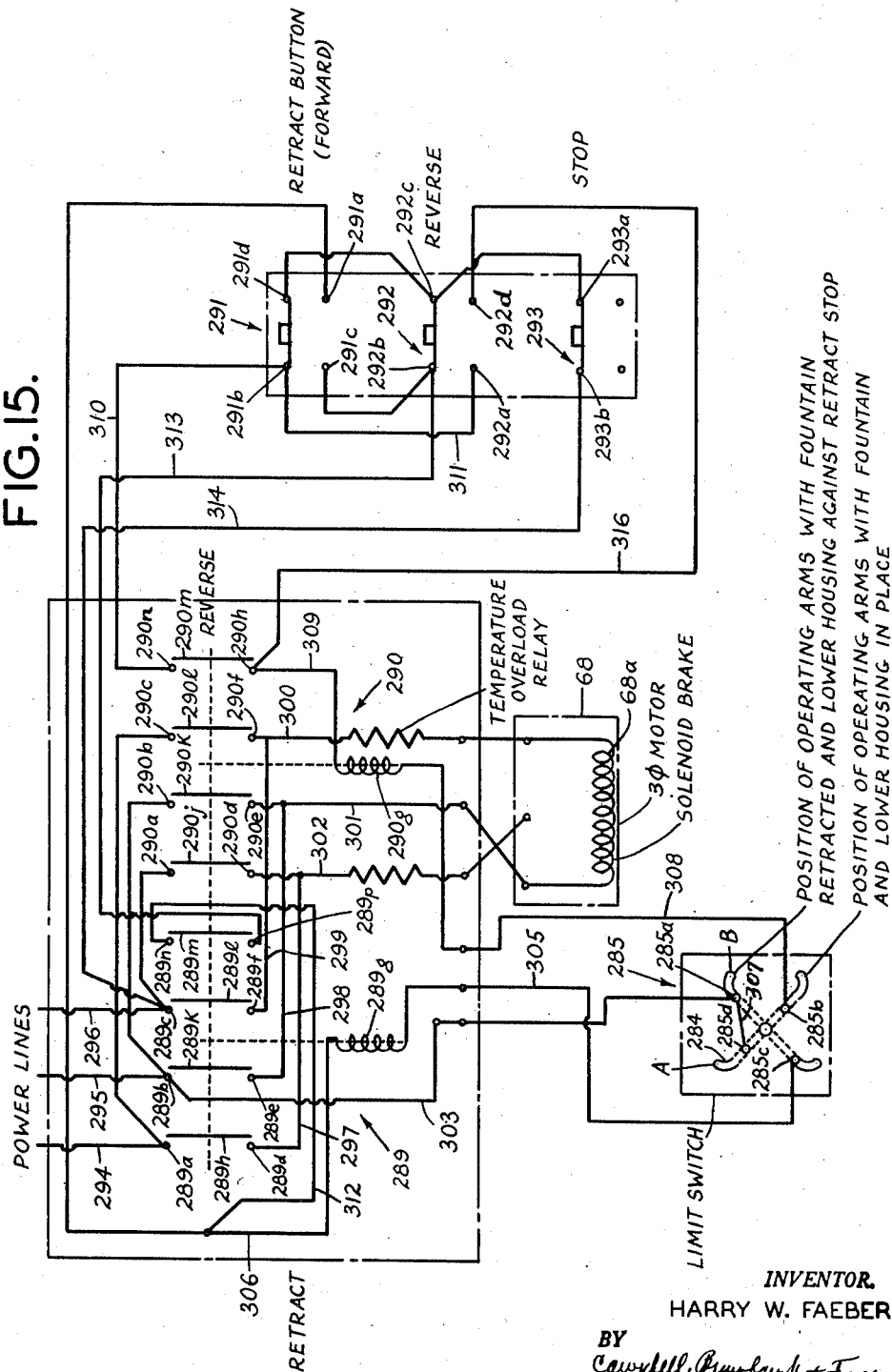
Figure 15 is a schematic wiring diagram for the control mechanism for starting, stopping and reversing the motor for moving one of the coating fountains.

The circuit for controlling the motor 68, which moves the fountain 23, is disclosed in Figure 15.

The limit switch 285 is illustrated with the C-shaped arm 284 in its two different positions and with the arm 284 in cooperative relationship with the contacts 285a, 285b, 285c and 285d.

The motor 68 is of the three phase type and is provided with a conventional solenoid brake 68a.

The control circuit includes two relays 289 and 290 for forward and reverse operation and the three momentary contact switches, 291 for forward operation, 292 for reverse, and 293 for stopping the motor 68. The circuit includes the three power lines 294, 295 and 296 which are connected respectively to the contacts 289a, 289b and 289c of the relay 289 and the contacts 290c, 290b and 290a of the relay 290. The opposed contacts 289d, 289e and 289f of the relay 289 are connected by means of conductors 297, 298 and 299 to the motor leads 302, 301 and 300, respectively. The motor leads 302, 301 and 300 are also connected to the contacts 290d, 290e and 290f, respectively, of the relay 290.

The motor leads 300 and 302 may be provided with coils of a temperature overload relay and a suitable resistance, as may be desired.

The relay 289 is provided with a relay coil 289g for shifting the relay blade contacts 289h, 289k, 289l and 289m. One end of the coil 289g is connected by means of the conductor 306 to the lower contact 291a of the switch 291. The opposite end of the coil 289g is connected by the conductor 305 to the contact 285c of the limit switch. The opposite contact 285a of the switch is connected by the conductor 303 to the lower contact 289b of the switch 291. The conductor 303 is also connected by means of conductor 307 to the contact 285d of the limit switch 285. The opposite contact 285b is connected by the conductor 308 to the relay coil 290g, the opposite end of which is connected by conductor 309 to the contact 290h of the relay 290. The opposite cooperating contact 290n is connected by the conductor 310 to the contact 291b of the switch 291 and by the conductor 311 to the contact 292a of the switch 292.

In order to form a holding circuit through the relay coil 289g, when it is desired to advance the fountain 23, for example, a connection is made through the conductor 312 between the conductor 306 and the contact 289n of the relay 289. The opposite contact 289p is connected by the conductor 313 to the contact 292b of the switch 292 and the contact 291c of the switch 291. The contacts 291d, 292c and the contact 293a, are connected in series. The opposite contact 293b of the "stop" switch 293 is connected by the conductor 314 to the contact 289c of the relay and hence to the power line 296. The contact 292d of the switch 292 is connected by the conductor 316 to the relay contact 290h.

The relay 290 is provided with four shiftable contact blades 290j, 290k, 290l and 290m, which are shifted by the coil 290g.

In operation, assuming that the contact arm 284 of the limit switch 285 is in position B corresponding to the retracted position of the fountain, when the switch 291 is depressed to advance the fountain, it connects the two switch contacts 291a and 291c. A circuit is thereby completed from the power line 295 to contact 289b, conductor 303, contact 285a, contact 285c, conductor 305, coil 289g, contacts 291a, 291c, contacts 292b, 292c, 293a, 293b, conductor 314 to contact 289c and power line 296, thereby energizing the relay coil 289g. This shifts all of the relay switch blades 289h, 289k, 289l and 289m into engagement with their cooperating contacts. This movement connects the power lines 294, 295 and 296, respectively, to the power lines 302, 301 and 300, thereby starting the motor 68 in a direction to cause the fountain to be advanced. At the same time, a holding circuit through relay coil 289g is formed from the contact 292b, conductor 313, relay contact 289p, relay blade 289m, contact 289n, conductor 312 to the line 306 so that upon release of the switch button of the switch 291, the circuit through the relay coil 289g remains closed and maintains the relay energized until the limit switch arm 285 is rocked out of engagement with the contacts 285a and 285c, and into engagement with the contacts 285b and 285d. Such movement deenergizes the relay 289 and the motor is stopped by the solenoid brake 68a, because a spring applies the brake when the solenoid is deenergized.

When the motor is to be driven in the opposite direction, the button of the switch 292 is depressed momentarily to connect the contacts 292a and 292d. A circuit is created thereby, as follows:

Power line 295, conductor 303, switch contacts 285a, 285d and 285b, conductor 308, relay coil 290g, conductor 309, conductor 316, contact 292d, contact 292a, conductor 311, contacts 291b and 291d, contacts 293a and 293b, conductor 314 to power line 296, thereby energizing the relay coil 290g. Actuation of the relay connects the power lines 294, 295 and 296, respectively, to the power lines 300, 301 and 302, thereby reversing the direction of the motor 68. At the same time, the switch blade 290m creates a holding circuit through the coil 290g from conductor 309, contacts 290h and 290n, conductor 310, switch contacts 291b and 191d, contacts 293a and 293b, conductor 314 to power line 296. The relay coil 290g therefore remains energized until the switch arm 284 is again shifted in response to the movement of the fountain to the limit of its retracted position.

If at any time it should be desirable to stop the motor 68 before either limit is reached, the switch 293 may be actuated, thereby deenergizing either relay coil 289 or 290 inasmuch as all connections through the relay coils 289g and 290g to the power line 296 are made through the switch 293.

Figure 16:
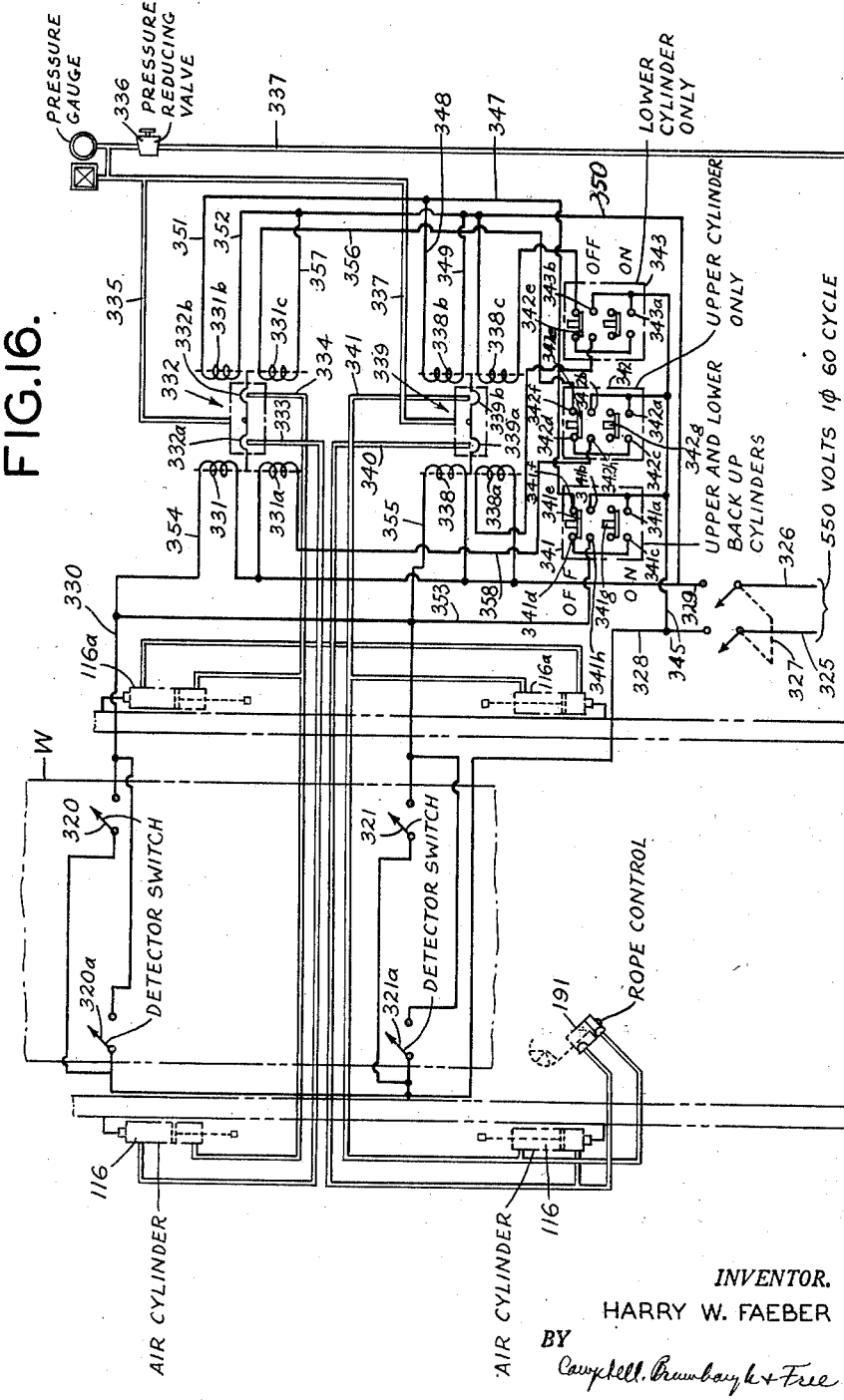
Figure 16 is a schematic wiring diagram of the mechanism for controlling the position of the back up rollers in response to detection of a break in the web and also for controlling the rope feeding means.

The coating machine illustrated herein is also provided with automatic web break detecting means which acts to retract the back up rollers 100 and 150 to prevent the coating material on the applicator rollers 70 and 150 from being applied directly to the surfaces of the back up rollers in the absence of a paper web therebetween. The web break detector is best shown in Figures 2 and 16. As shown in Figures 1 and 2, a plurality of switches 320, 320a, 321 and 321a are disposed adjacent the web and have contact fingers 322 and 323 bearing against the web to normally maintain the switches open. As many of the switches 320, 321, etc. as may be desired may be placed along the path of the web W.

Referring now to Figure 16, the web W is shown as passing beneath four switches 320, 321, 320a and 321a, which are held open by the web.

The web break detecting means may be connected to a pair of power lines 325 and 326 by means of a single throw double pole switch 327 which makes and breaks the connection between the power lines 325 and 326 and the lines 328 and 329. The line 328 is connected to one contact of each of the switches 320, 320a, 321 and 321a. The switches 320, 320a, 321 and 321a are connected in parallel. The opposite contacts of the switches 320 and 320a are connected by conductor 330 to a solenoid 331 for controlling an air control selector valve 332 provided with two valve elements 332a and 332b for opening and closing the conduits 333 and 334 which enter into the valve casing. Although a compressed air system is described, a hydraulic system can be used instead, if desired. The opposite side of the solenoid 331 is connected to the conductor 329. The solenoid 331 acts to open the valve 332a to admit air or other fluid under pressure to the conduit 334 from the conduit 335 which is connected through a pressure reducing valve 336 to a conduit 337, which is connected to a source of air or other fluid under pressure. The valve 332 is so designed that when the valve 332a is open to admit air or other fluid under pressure to the conduit 333, the conduit 334 is vented to atmosphere or return-drain line and when the valve 332a closes it vents the conduit 333 to atmosphere or return-drain line and opens the valve 332b to supply pressure to the conduit 334. When the valve 332b is opened to admit pressure to the conduit 334, the conduit 333 is vented to atmosphere or return-drain line. The switches 320, 320a, 321, 321a which are parallel connected with each other are connected in a series with a solenoid control 338 of an air or other fluid control valve 339 like the valve 332 for opening a valve element 339a to admit air or other fluid to the conduit 340 from the conduit 337. The coil 338 is also connected to the power line 329. Thus, solenoids 331 and 338 are connected parallel.

The conduit 333 is connected to the ends of the cylinders 116 and 116a at opposite ends of the back up roller 100 in order to force the piston rod therein in a direction to move the roller into engagement with the applicator roller 70. When the machine is in operation, pressure is maintained in the head end of cylinders 116 and 116a, which keeps the back up rollers 100 and 158 in contact with or closely adjacent to the applicator rollers 70 and 156, respectively.

If the web should break so that any one of the switches 320, 320a, 321 or 321a should close, the solenoids 331 and 338 are energized with the result that the conductors 333 and 340 are opened to atmosphere or return-drain line in the head end of the air or other fluid cylinder. At the same time, the conductors 334 and 341 are connected with the pressure lines 335 and 337, respectively, and the back up cylinders are moved out of contact with the applicator rollers.

Inasmuch as it may be desirable to move the back up cylinders into and out of working position regardless of a web break, a series of independent controls are also provided. The independent controls include the switch 341 for moving into and out of contact both of the back up rollers 100 and 158, the switch 342 for moving into and out of contact the back up roller 100 and the switch 343 for moving into and out of contact the back up rollers 158. In order to accomplish this result, the air control valve 332 is provided with three additional solenoid controls 331a, 331b and 331c. Also, the air control valve 339 is provided with three additional solenoids 338a, 338b and 338c. The solenoids 331a and 338a are utilized to retract the back up rollers while the other solenoids 331b and 331c are utilized to advance the roller 100. The solenoids 338b and 338c are utilized to advance the roller 158. Advancement of the roller 100 is accomplished by supplying pressure from the valve 332a through the conduit 333 which is connected to the head ends of the cylinders 116, 116a at the same time opening the line 334 to the atmosphere so as to force the piston in a direction to advance the back up roller. Similarly, the solenoids 338b and 338c control the valve 339a to introduce air or other fluid into the conduit 341 which delivers air or other fluid to the lower set of cylinders 116—116a, at the same time opening the line 341 to the atmosphere or return-drain line, so as to advance the roller 158.

The circuit connections for controlling the solenoids are as follows:

Conductor 328 is connected by the conductors 345 to the contacts 341a, 342a, 343a and the contacts 341b, 342b and 343b of the switches 341, 342 and 343. The contact 341c of the switch 341 is connected to the contact 341d through the normally closed switch 341e, the contact 341f, the conductor 347, the conductor 348 to the solenoid 338b, the opposite end of which is connected by the conductors 349 and 350 to the line 329. Similarly, the solenoid 331b is connected to the conductor 347 by conductor 351 and by the conductor 352 to the conductor 350. Thus, when the lower switch button 341g is depressed into engagement with the contacts 341a and 341c, both of the solenoids 331b and 338b are energized and air under pressure is delivered to the conduits 333 and 340, actuating the jacks 116—116a to advance both of the back up rollers.

In order to retract both of the back up rollers simultaneously, the contact 341h of the switch 341 is connected by means of the conductor 353 and the conductors 354 and 355 to the solenoid coils 331 and 338 which are connected to the conductor 329 as indicated above. Therefore, when the switch button 341e is depressed, the coils 331 and 338 are energized from power line 328, conductor 345, contacts 341b and 341h, conductor 353, conductors 354 and 355, coils 331 and 338 to the line 329.

If only one of the back up rollers, for example, the back up roller 100 is to be advanced or retracted, the switch 342 may be used for this purpose. In this switch, the contact 342c is connected to the contact 342d, through the normally closed switch blade 342e, contact 342f, conductor 356, coil 331c, conductor 357 to conductor 350 which is connected to the line 329. Therefore, if the lower switch 342g is closed, the solenoid 331c is energized and air or other fluid under pressure is delivered to the conduit 333, thereby advancing the cylinder 100. To retract the cylinder, the circuit may be completed from the contact 342b through switch blade 342e to contact 342h, conductor 358 through solenoid coil 331a to the line 329, thereby supplying air to the conduit 334 to withdraw the piston rods and lift the cylinder or roller 100.

The contacts of the switch 343 are similarly connected to the solenoids 338a and 338c, associated with the air control valve 339 to advance and retract the cylinder 158.

The air control system is also used to control the rope drive cylinder 191. Thus, the conduit 340 is connected to one end of the cylinder 191 so as to disconnect the rope drive when the back up roller 158 is advanced into working position, and the conduit 341 is connected to the opposite end of the cylinder 191 to engage the rope drive mechanism when the back up roller 158 is retracted.

Although the detector switches are held open by the web and will close when the web breaks, they are provided with a detent which permits the operator to keep these switches open without a web. Thus, the above-described control system provides great flexibility in the movement of the back up rollers with respect to the applicator rollers and makes certain of quick disengagement of these rollers upon breakage of the web. Moreover, it permits the rollers to be advanced and retracted, as may be required, for cleaning and for other reasons.

Figure 17:
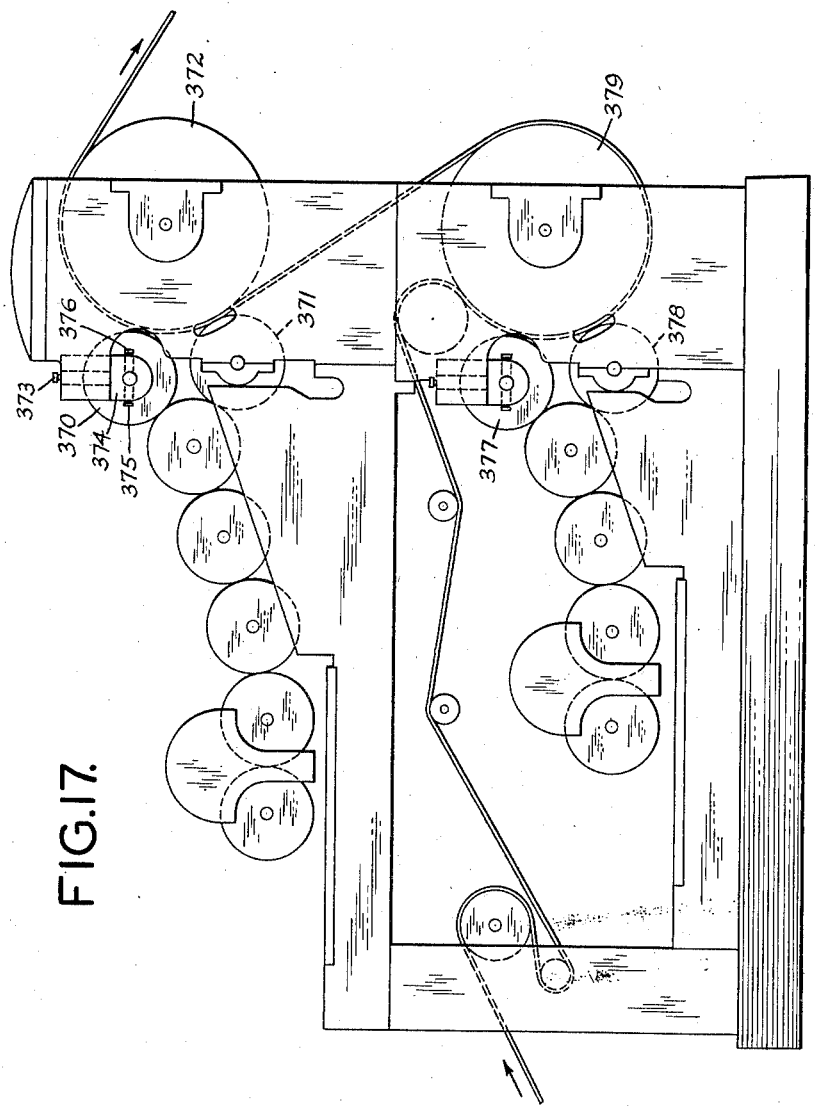
Figure 17 is a view in side elevation of a modified form of coating machine, shown with parts removed to disclose a modified arrangement of the distributing and applicator rollers.

The above-described coating machine is susceptible to considerable modification, for example, in the arrangement and number of the distributing and applicator rollers. As shown in Figure 17, the upper section of the machine may be provided with two applicator rollers 370 and 371 mounted on the frame of the machine for cooperation with the web supported on the back up roller 372. The rollers 370 and 371 are substantially vertically spaced. The upper roller 370 can be adjusted up and down by means of a screw 373 engaging the journal blocks 374 which are at opposite ends of the roller and are slidably mounted in the frame. If desired, the roller 370 may be mounted for horizontal adjustment by means of screws 375 and 376 threaded into the journal blocks 374 and engaging the bearings for the roller which are mounted in the journal blocks.

The applicator rollers 377 and 378 may be mounted on the frame for cooperation with the lower back up roller 379 in the same way as the rollers 370 and 371, respectively.

The above-described coating machines have great flexibility in operation and are able to handle coating compositions of widely varied consistency and to apply layers of coating material of a desired thickness for the reason that the rollers thereof may be adjusted precisely, and their speeds may be adjusted as the purpose demands. Inasmuch as the paper comes in contact only with the back up and applicator rollers, it is possible to have a substantial variation in the peripheral velocities of the distributing rollers and the applicator rollers without damaging or tearing the web. Moreover, the speeds of the applicator rollers and back up rollers can be brought into very close synchronization or can be varied from synchronization, as may be desired.

The automatic control systems for the fountain and the applicator rollers makes it possible to adjust the pressure between these rollers and the spacing between them without danger or damage to any of the drive or adjusting mechanisms for these rollers.

It will be understood that the coating machine described above is susceptible to considerable modification in the size and relationship of the parts and that the transmissions may be modified substantially, if desired. Moreover, it will be understood that the machine can be used either for coating finished paper or it may be used in conjunction with a paper making machine by interposing it in the train of drying rollers at a suitable point where the paper has been partially dried. Therefore, the form of the invention described herein should be considered as illustrative and not as limiting the scope of the following claims.

I claim:

1. A coating fountain having a roller adapted to supply a coating composition, a plurality of distributing rollers, an applicator roller, one of said distributing rollers being movable into and out of engagement with the fountain roller, and another of said distributing rollers being movable into and out of engagement with said applicator roller, means supporting said distributing rollers for movement toward and away from said applicator roller, means for moving said distributing rollers toward and away from said applicator roller, and means to adjust the spacing between said distributing rollers.

2. A coating machine for webs of flexible material comprising a frame, bearings on said frame, an applicator roller for applying a coating composition to a web and rotatably mounted in said bearings, a back up roller for holding said web against said applicator roller, means to guide said web into engagement with said back up roller and wrap said web partially around said back up roller, power means to rotate said back up roller to advance said web, means supporting said back up roller for movement toward and away from said applicator roller, a coating fountain, at least one distributing roller for delivering coating composition from said fountain to said applicator roller, means for adjusting said fountain and said distributing roller relative to said applicator roller, and means for rotating said last-named rollers.

3. A coating fountain having a pair of gate rollers adapted to receive a coating composition, a plurality of distributing rollers, an applicator roller, one of said distributing rollers being movable into and out of engagement with one of said gate rollers, and another of said distributing rollers being movable into and out of engagement with said applicator roller, means supporting said distributing rollers and said fountain for movement toward and away from said applicator roller means for moving said fountain and said distributing rollers toward and away from said applicator roller, and means to adjust the spacing between said distributing rollers.

4. A coating machine comprising a frame, an applicator roller rotatably mounted in said frame for applying coating composition to a web, a series of distributing rollers parallel with and adjacent to said applicator roller to supply coating composition to said applicator roller, means supporting at least one of said distributing rollers for sliding movement relative to said applicator roller said supporting means being inclined downwardly with respect to said applicator roller, a coating fountain adjacent to the lowermost of said distributing rollers to supply coating composition to said distributing rollers and movable in said frame relative to said applicator roller, means for moving said coating fountain relative to said applicator roller, and means on said fountain for moving said distributor rollers toward said applicator roller upon movement of said fountain in one direction.

5. A coating machine comprising a frame, bearings on said frame, an applicator roller for applying coating composition to a web rotatably mounted in said bearings, inclined guideways on said frame extending downwardly away from said roller, at least one distributing roller to supply coating composition to said applicator roller, means supporting said distributing roller on said guideways for movement toward and away from said applicator roller, a coating fountain mounted on said frame adjacent to the lower end of said guideways for movement toward and away from said applicator roller to supply coating composition to said distributing roller, and means on said fountain and said distributor roller supporting means engageable to move said distributor roller toward said applicator roller.

6. A coating machine comprising a frame, an applicator roller rotatably mounted in said frame for applying coating composition to a web, a series of distributing rollers parallel with and adjacent to said applicator roller to supply coating composition to said applicator roller, means supporting said distributing rollers for movement toward and away from said applicator roller, wedge means interposed between and adjustable relatively to said roller supporting means for adjusting the spacing between said distributing rollers, a coating fountain adjacent to said distributing rollers to supply coating composition to said distributing rollers and movable in said frame toward and away from said applicator roller, means for moving said coating fountain toward and away from said applicator roller, and means on said fountain engageable with the supporting means for one of said distributor rollers for moving said distributor rollers toward said applicator roller upon movement of said fountain toward said applicator roller.

7. A coating machine comprising a frame, an applicator roller rotatably mounted in said frame for applying coating composition to a web, a series of distributing rollers parallel with and adjacent to said applicator roller to supply coating composition to said applicator roller, means at opposite ends of and supporting said distributing rollers for rotation and movement toward and away from said applicator roller, gear and rack means connecting the supporting means at opposite ends of one of said distributing rollers to maintain said one of said distributing rollers parallel with said applicator roller, a coating fountain adjacent to said distributing rollers to supply coating composition to said distributing rollers and mounted in said frame for movement toward and away from said applicator roller, means for moving said coating fountain toward and away from said applicator roller, and means on said fountain engageable with the supporting means of one of said distributing rollers for moving said distributor rollers toward said applicator roller upon movement of said fountain toward said applicator roller.

8. A coating machine comprising a frame, an applicator roller rotatably mounted in said frame for applying coating composition to a web, inclined guideways on said frame extending downwardly away from said roller, at least one distributing roller to supply coating composition to said applicator roller, means supporting said distributing roller on said guideways for sliding movement toward and away from said applicator roller, a coating fountain to supply coating composition to said distributing roller mounted on said frame adjacent to the lower end of said guideways for movement toward and away from said applicator roller, power means for moving said fountain toward and away from said applicator roller, limit stop means for shutting off said power means at the end of a predetermined movement of said fountain in either direction, and means on said fountain and said supporting means for moving said distributor roller with said fountain toward said applicator roller.

9. A coating machine comprising a frame, an applicator roller rotatably mounted in said frame for applying coating composition to a web, means for supplying coating composition to said applicator roller, a back up roller adjacent to said applicator roller for supporting said web for application of the coating composition thereto, collars rotatably mounted in said frame, bearings for supporting said back up roller eccentrically in said collars whereby rotation of said collars moves said back up rollers toward and away from said applicator roller, and a pair of pneumatic jacks having pistons engageable with said collars for rotating them to move said back up roller toward said applicator roller.

10. A coating machine comprising a frame, an applicator roller rotatably mounted in said frame for applying coating composition to a web, means for supplying coating composition to said applicator roller, a back up roller adjacent to said applicator roller for supporting said web for application of the coating composition thereto, collars rotatably mounted in said frame, bearings for supporting said back up roller eccentrically in said collars whereby rotation of said collars moves said back up roller toward and away from said applicator roller, a pair of pneumatic jacks having pistons engageable with said collars for rotating them to move said back up roller toward said applicator roller, an adjustable abutment means on said frame engageable with at least one of said collars for limiting the movement of said back up roller toward said applicator roller.

11. In a coating machine, the combination of a frame, an applicator roller rotatably mounted in said frame for applying a coating composition to a web, means for guiding said web into contact with said applicator roller, a back up roller for supporting said web adjacent to said applicator roller for application of coating composition thereto, eccentric bearings for said back up roller rotatably mounted on said frame for moving said back up roller toward and away from said applicator roller, power means for rotating said bearings to move said applicator roller toward and away from said back up roller, means in the path of said web for detecting a break in said web and means responsive to detection of a break in said web by said break-detecting means for actuating said power means to move said back up roller away from said applicator roller.

12. In a coating machine, the combination of a frame, an applicator roller rotatably mounted in said frame for applying a coating composition to a web, a back up roller for supporting a web for application of the coating composition thereto, eccentric bearings for said back up roller rotatably mounted in said frame for moving said back up roller toward and away from said applicator roller, means connecting said bearings for simultaneous rotation in the same direction through equal angles, and power means for rotating said bearings to move said back up roller toward said applicator roller.

13. A coating machine comprising a frame, an applicator roller rotatably mounted in said frame for applying coating composition to a web, means for supplying coating composition to said applicator roller, a back up roller for supporting said web for application of the coating composition thereto, collars rotatably mounted in said frame, bearings for supporting said back up roller eccentrically in said collars whereby rotation of said collars moves said back up roller toward and away from said applicator roller, power means for rotating said collars to move said back up roller toward said applicator roller, means responsive to breaking of said web for actuating said power means in a direction for rotation of said collars to move said back up roller away from said applicator roller, and adjustable means for limiting the movement of said back up roller toward said applicator roller.

14. A coating machine comprising a frame; a pair of coating units mounted in said frame one above the other, each unit having a fountain for receiving coating composition movably mounted in said frame adjacent one end thereof, an applicator roller for applying coating composition to a web rotatably mounted in a fixed position in said frame at the opposite end thereof from said fountain, and distributing rollers rotatably and movably supported in said frame for bodily and rotary movement relative to said applicator roller mounted in said frame between said fountain and said applicator roller for transporting coating composition from said fountain to said applicator roller, means to move said distributing rollers into and out of coating composition transporting relation to said applicator roller, and a back up roller movable toward and away from said applicator roller for supporting said web in contact with said applicator roller at the side thereof opposite from said fountain;

means for guiding said web lengthwise of said frame from said one end thereof between and out of contact with the fountains and distributing rollers of said units and into contact with and between the applicator and back up rollers of one of said units, said web thereafter being inverted and passed into contact with and between the applicator and back up rollers of the outer unit to expose opposite sides of said web to the applicator rollers of the units.

15. A coating machine comprising a frame; a pair of coating units mounted in said frame one above the other, each unit having an applicator roller for applying coating composition to a web, means for supplying coating composition to said roller, and a back up roller for supporting said web in contact with said applicator roller; a plurality of guide members mounted in said frame between said units for guiding said web into contact with the applicator roller and the back up roller of one of said units, said web then being passed into contact with the back up roller and applicator roller of the other unit, pulleys mounted on said guide means, at least one endless flexible feed member having flights supported by said pulleys, a pulley concentric with each of said back up rollers for supporting said flexible feed member, and means for clutching one of said concentric pulleys to its back up roller for rotation therewith to move said feed member, and for unclutching said one pulley from its back up roller to stop said feed members.

16. A coating machine comprising a frame; a pair of coating units mounted in said frame one above the other, each unit having an applicator roller for applying coating composition to a web, means for supplying coating composition to said roller, and a back up roller for supporting said web in contact with said applicator roller; a plurality of guide members mounted in said frame between said units for guiding said web into contact with the applicator roller and the back up roller of one of said units, said web then being passed into contact with the back up roller and applicator roller of the other unit, pulleys mounted on said guide means, a pair of endless flexible feed members each having one flight supported by said pulleys, a pulley concentric with each of said back up rollers for supporting said flexible feed members, means for separating the feed members after passing over the pulley concentric with said back up roller of said other unit to release said web, and means for clutching one of said concentric pulleys to its back up roller for rotation therewith to move said feed members, and for unclutching said one pulley from its back up roller to stop said feed members.

17. A coating machine comprising a frame; a pair of coating units mounted on said frame one above the other, each unit including an applicator roller, a fountain for supplying coating composition to said roller, and a back up roller for supporting a web adjacent to said applicator roller for application of coating composition thereto; a plurality of guide rollers rotatably mounted in said frame for guiding said web into contact with and between the applicator and back up rollers of each unit in succession; pulleys rotatably mounted adjacent one end of each of said guide rollers and said back up rollers; at least one endless flexible member having substantially parallel flights supported by said pulleys engageable with an edge of said web, and outer flights out of engagement with said web; clutch means interposed between one of said back up rollers and the pulley adjacent to its end for connecting and disconnecting them; and means for driving the fountains and rollers of said units.

18. A coating machine comprising a frame; a pair of coating units mounted on said frame one above the other, each unit including an applicator roller, a fountain for supplying coating composition to said roller, and a back up roller mounted for movement toward and away from said applicator roller for supporting a web adjacent to said applicator roller for application of coating composition thereto; a plurality of guide rollers rotatably mounted in said frame for guiding said web into contact with and between the applicator and back up rollers of each unit in succession; means for moving said back up rollers of both units toward and away from their corresponding applicator rollers; pulleys rotatably mounted adjacent one end of each of said guide rollers and said back up rollers; a pair of endless flexible members, each having an adjacent inner flight supported by said pulleys engageable with an edge of said web, and outer flights out of engagement with said web; clutch means interposed between one of said back up rollers and the pulley adjacent to its end for connecting and disconnecting them, power means for actuating said clutch means; means connecting said power means and said back up rollers, for actuating said clutching means to connect said one of said back up rollers to the pulley adjacent its end when said back up rollers are moved away from their applicator rollers, and for disconnecting said one of said back up rollers and the last-mentioned pulley when said back up rollers are moved toward their applicator rollers; and means for driving the fountains and rollers of said units.

19. In a coating machine, the combination of an applicator roller for applying coating composition to a web, a back up roller for supporting said web in contact with said applicator roller, and rope feed means for threading a web between said applicator and back up rollers, comprising a pulley substantially concentric with and of substantially the same diameter as said back up roller adjacent to one end of said back up roller and rotatable relatively thereto, a separate gear fixed to each of said back up roller and said pulley, other gears meshing with said separate gears, and a clutch and brake mechanism operable selectively to clutch said other gears together or to stop said gear fixed to said pulley.

HARRY W. FAEBER.

REFERENCES CITED

The following references are of record in the file of this patent:

UNITED STATES PATENTS

| Number | Name | Date |
| --- | --- | --- |
| 194,613 | Morton | Aug. 28, 1877 |
| 205,367 | Dooley | June 25, 1878 |
| 226,733 | Eyster | Apr. 20, 1880 |
| 448,063 | McCoy | Mar. 10, 1891 |
| 842,283 | West | Jan. 29, 1907 |
| 984,991 | Albert | Feb. 21, 1911 |
| 1,008,616 | Sargent | Nov. 14, 1911 |
| 1,034,492 | Nielsen | Aug. 6, 1912 |
| 1,542,835 | Pohl | June 23, 1925 |
| 2,000,325 | Ford et al. | May 7, 1935 |
| 2,074,237 | Pierce | Mar. 16, 1937 |
| 2,300,549 | Huck | Nov. 3, 1942 |